B. M. & E. R. Gard.

Brick Machine.

No. 4,108. Reissued Aug. 23, 1870.

Witnesses:
Henry A. Myers
Edmund Masson

Inventor:
Benjn. M. Gard & Emery R. Gard.
By their attorney A. B. Stoughton.

N. PETERS, PHOTO-LITHOGRAPHER, WASHINGTON, D. C.

United States Patent Office.

THE UNITED STATES BRICK-MACHINE COMPANY, OF CHICAGO, ILLINOIS, ASSIGNEE OF BENJAMIN M. GARD AND EMERY R. GARD.

*Letters Patent No.* 100,136, *dated February* 22, 1870; *reissue No.* 4,108, *dated August* 23 1870.

IMPROVEMENT IN BRICK-MACHINES.

The Schedule referred to in these Letters Patent and making part of the same.

*To all whom it may concern:*

Be it known that we, BENJAMIN M. GARD, of Urbana, in the county of Champaign and State of Ohio, and EMERY R. GARD, of Chicago, in the county of Cook and State of Illinois, have invented an Improved Brick-Machine; and we do hereby declare that the following is a full and exact description thereof, reference being had to the accompanying drawing making part of this specification—

Figure 1:
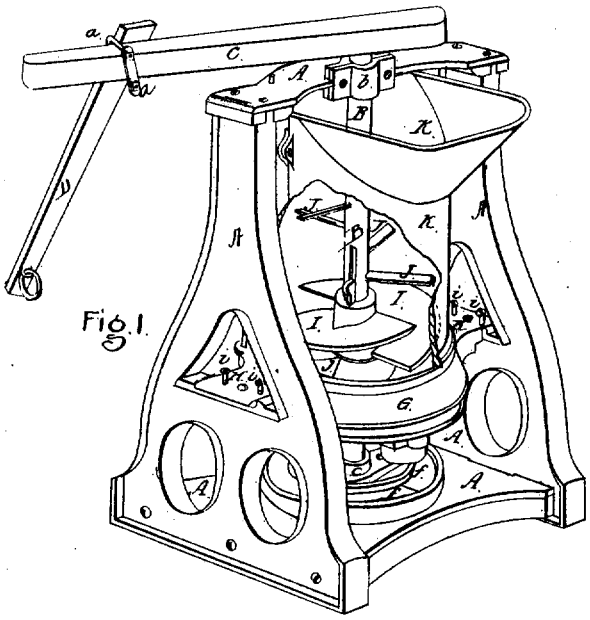
Figure 2:
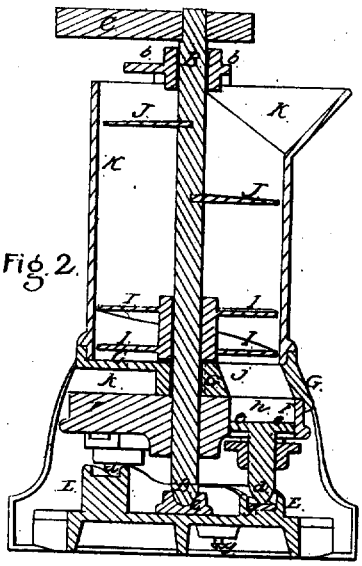
Figure 4:
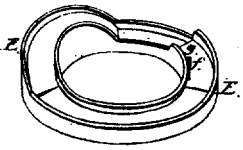
Figure 3:
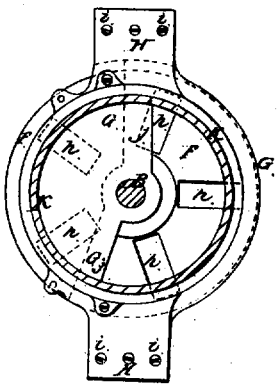

Figure 1 being a view of the machine, in perspective, with a portion of the side of the pug-mill represented as broken away, to show the construction of parts inside thereof;

Figure 2, a central vertical section of the same;

Figure 3, a horizontal section of the pug-mill, and showing a plan of the machine below; and Figure 4, a view, in perspective, of a part detached.

Like letters designate corresponding parts in all of the figures.

The object of our invention is to produce a brick-machine of the utmost simplicity of construction and operation, compactness and strength of form, efficiency and perfection of work.

The leading feature, by which we accomplish these important results, consists in the arrangement of all the working parts of the machine upon a single shaft, whereby they are driven, thus avoiding both gearing and unnecessary multiplicity of parts; and also in placing the stationary parts around the same shaft, thereby reducing the size and cost of the machine, and securing strength, with the least material.

A strong and compact frame, A, of the form shown, or any other, suitable to the purpose, receives the other parts of the machine; and centrally therein is mounted a single shaft, B, which has secured upon it and drives, all the moving parts of the machine. These operative parts are: the mold-wheel F, containing the brick-molds *h h*; the feeding-screw I, composed of one, two, or more wings; and the mixing-arms or knives J J, of any desired number and form. And around this shaft are arranged the fixed or passive parts of the machine, consisting mainly of the hopper or tub K of the pug-mill; the pug-mill bottom, G, through which the clay or material is transmitted and fed to the mold-wheel; and the track or cam-way E, over which the mold-followers travel, and from which they receive their movements.

The construction and arrangement of the tub K of the pug-mill, and of the mixing-arms J J, and feeding-screw I therein, are not special to our invention, and need no further description here. Nor is there any necessary peculiarity in the mold-wheel F, and its molds *h h*, and followers *e e*, requiring specification.

But the construction of the tub or pug-mill bottom G is peculiar to, and an important feature of, our invention. One side fits down closely upon the mold-wheel F, and has an opening, *j*, through which the clay is forced down into the molds of the mold-wheel. The other side is elevated above the mold-wheel high enough to furnish a space, *k*, between it and the mold-wheel, to allow the bricks to be raised out of the molds, and to be readily reached and removed. This elevated portion of the pug-mill bottom is a necessary feature when the mold-wheel is on the same shaft as the pug-mill.

The pug-mill bottom has projecting flanches H H, by which it is secured to the sides of the frame A, formed for the reception of the same. There are set-screws *i i* in these flanches, by which the bottom may be adjusted in position accurately to the mold-wheel.

The followers *e e* of the molds *h h* have their upward movements, for pressing the bricks in, and expelling them from, the molds, produced by means of a circular track or cam-way, E, on which the stems *d d* of the followers travel as the mold-wheel revolves.

In order to keep this track well lubricated, for the follower-stems to slide on, it has raised sides or flanges, forming a trough, so that it will hold the lubricating oil. The cam-shape of the track or way is such as to effect the movements required.

In order to compress the clay after it is filled into the molds, the followers are raised somewhat as the molds pass under the pressure-plate, beneath the pug-mill bottom. The portion of the cam-way which produces this pressure has a movable steel plate, *f*, provided with a set-screw or set-screws, *g*, for adjusting its height and inclination as it wears, or to vary the degree of compression.

The machine, when driven by horse-power, has a sweep, C, attached, in the usual manner, to the upper end of the driving-shaft B. To this sweep we attach a draft-arm, D, projecting obliquely downward and outward, by means of a tightening clamp or clip, *a*, which embraces both the sweep and arm, as shown. By loosening the screws of the clamp the arm may be moved outward or inward on the sweep, and then clamped fast in any position. With this simple means the sweep may be adjusted so as to change i s leverage, and adapt it to the number and strength of the horses or other animals employed to drive the machine. Thus, if the team is weak, the draft-arm can be moved outward, to increase the leverage and lessen the speed, by traveling in a larger circle; but, for a stronger team, the draft-arm is moved inward, to utilize the power by quicker work.

What we claim as our invention, and desire to secure by Letters Patent, is—

1. The arrangement of the mold-wheel and feeding-screw both fast upon, and driven directly by, the same shaft, substantially as shown and described, and for the purpose specified.

2. The arrangement of the mixing-arms and the mold-wheel, substantially as shown and described, both being fast upon and driven directly by the same shaft, as and for the purpose herein set forth.

3. The arrangement of the pug-mill bottom G concentric around the same shaft that bears and drives the mold-wheel and feeding-screw, substantially as and for the purpose herein specified.

4. The arrangement of the pug-mill tub, tub-bottom, mixing-arms, feeding-screw, mold-wheel, and follower cam-way, on and around one driving-shaft, for the purposes herein specified.

5. The pug-mill bottom G, having one side, which is provided with the feed-opening *j*, arranged to fix closely over the mold-wheel, and the other side raised above the mold-wheel, to admit of the expulsion and removal of the bricks, substantially as herein set forth.

6. The flanged or oil-trough cam-way E, with its adjustable cam-plate *f*, for the purpose herein set forth.

7. The movable draft-arm D, with its adjusting clamp *a*, in combination with the sweep C, as applied to the driving-shaft B of the brick-machine, substantially as and for the purpose herein set forth.

BENJAMIN M. GARD.

Witnesses to B. M. GARD'S signature:
WM. A. SCOTT,
CHAS. DARLINGTON.

EMERY R. GARD.

Witnesses to E. R. GARD'S signature:
L. D. LOWRY,
A. J. CLOSE.